J. T. F. CONTI.
GRIPPING MECHANISM.
APPLICATION FILED AUG. 18, 1908.
989,696.
Patented Apr. 18, 1911.
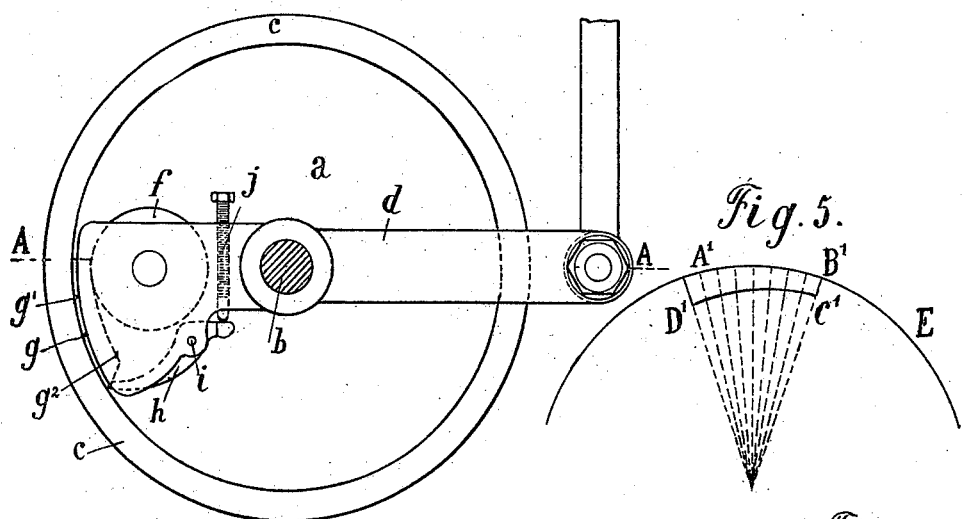
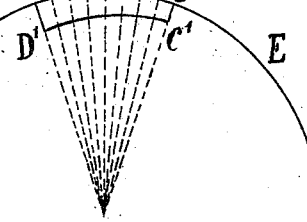
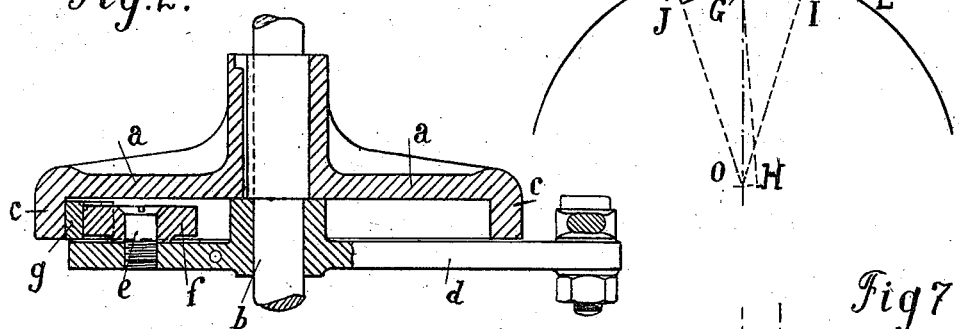
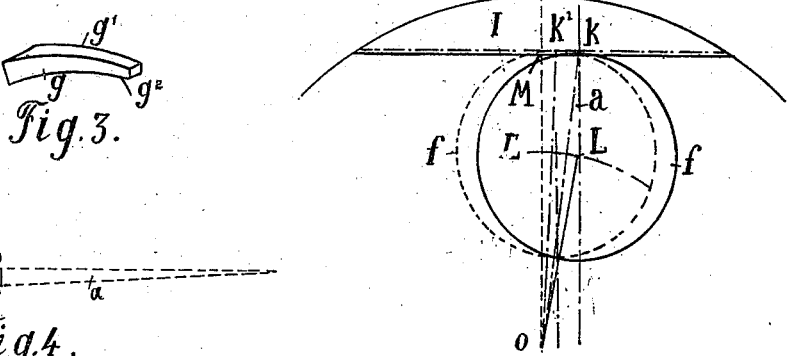

UNITED STATES PATENT OFFICE.

JAMES TIBURCE FELIX CONTI, OF PARIS, FRANCE.

GRIPPING MECHANISM.

989,696.  Specification of Letters Patent.  Patented Apr. 18, 1911.

Application filed August 18, 1908. Serial No. 449,184.

*To all whom it may concern:*

Be it known that I, JAMES T. FELIX CONTI, a citizen of the French Republic, and resident of Paris, France, have invented certain new and useful Improvements in Gripping Mechanism, of which the following is a specification.

The present invention relates to gripping mechanism, and it has for its object among others to provide an improved mechanism which will work silently without shock or loss of time whatever the wear may be. The said mechanism embodies a wedge curved on both faces and interposed between a pulley mounted on the shaft to be driven and a friction roller mounted on the driving shaft, so as to turn freely on the latter, a counter-acting spring being provided for constantly holding the roller in contact with both such pulley and roller in order to avoid any lost motion.

The invention is clearly illustrated in the accompanying drawings, which, with the letters of reference marked thereon, form a part of this specification, and in which—

Figure 1 is a front elevation. Fig. 2 is a section on the line A—A of Fig. 1. Fig. 3 is a perspective view of the wedge. Figs. 4 to 7 are diagrams illustrating the invention and the construction of the curved wedge.

Like letters of reference indicate like parts throughout the different views.

As shown in Figs. 1 and 2, the present gripping mechanism consists essentially of a pulley $a$ fixed on a shaft $b$ and provided on its periphery with a flange $c$. On the shaft $b$ is loosely mounted a driving lever $d$ supporting the axis $e$ of the roller $f$. In the space between said roller and the flange of the pulley is engaged a curved wedge $g$ shown in Fig. 3 actuated through the lever $h$ mounted to rotate freely about an axis $i$ on the lever $d$ and acted upon by a spring $j$. This curved wedge has a cylindrical external surface $g'$ corresponding exactly with the internal surface of the flange $c$ of the pulley; its external face $g^2$ is formed with a determined particular curve so that the wedge angle will be constantly the same, whatever may be the wear of the surfaces in contact. The said curved wedge is practically a straight wedge which has been so arched that it may be applied against the internal surfaces of the flange of the pulley. It may be obtained as follows: A straight wedge A B C D, Fig. 4, is first constructed, having the development of the curved wedge to be made and offering the wedge angles which is desired; the said wedge is then divided by tracing a certain number of ordinates; afterward on a circle E (Fig. 5) having the same radius as the internal circumference of the crown to be driven the length A B is carried to A' B' as well as the divisions between A and B. These divisions are connected in the center on each of the so traced radii. The different corresponding ordinates carried, and the curve C' D' obtained in joining these different points is the searched curve.

Practically in order to be able to obtain a curvature on both faces, the following mode of procedure may be followed. Referring to Fig. 6, as before, a circle E is traced with the same radius as the circumference to be driven, then a length F G equal to the mean thickness of the wedge to be obtained (preferably this thickness will not exceed a tenth of the radius) is transferred on a radius O F, and an isosceles triangle O G H is so constructed that the angle of the center O G H is equal to the wedge angles. From the point H a circle is traced passing through G. The said circle settles the internal surface curve of the wedge.

Fig. 7 shows a gripping mechanism comprising a flat surface wedge I. To obtain the wedging, the wedging angles formed of the right lines connecting the contact point K of the roller $f$ with the wedge I, to the centers L and O of the said roller and of the pulley must have a well determined value, varying according to the coefficients of friction of the surfaces in contact, because if this angle is too great, no wedging is produced and the wedge is carried along with the roller $f$, on the contrary, if it is too small, this roller is released with great difficulty when it is no more to be used.

By my improved construction the definite special curve given to the internal curved surface makes the wedge angle able to keep about a constant value whatever the position of contact point of the wedge may be and, consequently, whatever the wear of the rubbing surfaces may be. The wedge angle being constant, and the wedge being constantly maintained in contact with the roller, and the surface to be driven, a perfect driving without shocks or loss of time and an instantaneous disengagement is always obtained regardless of the wear.

The lever $d$ may be so disposed as to allow the application of several rollers and of several curved wedges.

Having now particularly described the nature of the invention and in what manner the same is to be performed I say that what I claim is:

1. The combination with a shaft and a pulley thereon having a peripheral flange, of a driving lever mounted on said shaft, a roller mounted for free rotation on the side of said lever adjacent said pulley, a curved wedge interposed between said roller and flange with its external face concentric with the internal surface of the flange and its internal face formed upon a determined particular curve whereby the wedge angle is constantly the same notwithstanding the wear of the contacting surfaces and a lever mounted to rotate freely about an axis on said driving lever for actuating said wedge.

2. The combination with a shaft and a pulley thereon having a peripheral flange, of a driving lever mounted on said shaft, a roller mounted for free rotation on the side of said lever adjacent said pulley, a curved wedge interposed between said roller and flange with its external face concentric with the internal surface of the flange and its internal face formed upon a determined particular curve whereby the wedge angle is constantly the same notwithstanding the wear of the contacting surfaces, a lever pivotally mounted on the first-named lever and acting on said wedge, and means carried by the first-named lever adjustable therethrough with its inner end acting on the tail of the second lever.

In testimony whereof I affix my signature.

JAMES TIBURCE FELIX CONTI.

In the presence of—
H. C. COXE,
GEORGE PIGOT.

---

Copies of this patent may be obtained for five cents each, by addressing the "Commissioner of Patents, Washington, D. C."